(12) United States Patent
Han et al.

(10) Patent No.: US 8,335,505 B2
(45) Date of Patent: Dec. 18, 2012

(54) METHOD AND APPARATUS FOR NEIGHBOR DISCOVERY IN IPV6-BASED MOBILE SYSTEM

(75) Inventors: Youn-Hee Han, Guri-si (KR); Jin-Hyeock Choi, Yongin-si (KR); Hee-Jin Jang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1445 days.

(21) Appl. No.: 11/581,329

(22) Filed: Oct. 17, 2006

(65) Prior Publication Data

US 2007/0099649 A1  May 3, 2007

Related U.S. Application Data (60) Provisional application No. 60/732,668, filed on Nov. 3, 2005.

(30) Foreign Application Priority Data

May 22, 2006 (KR) .............. 10-2006-0045680

(51) Int. Cl.
*H04W 40/00* (2009.01)
(52) U.S. Cl. ........ 455/428; 370/255; 370/312; 370/390; 370/254; 370/328; 370/400; 370/401; 370/389; 455/525

(58) Field of Classification Search .......... 370/400, 370/255, 312, 390, 254, 401, 328, 389; 455/428, 455/525
See application file for complete search history.

(56) References Cited

U.S. PATENT DOCUMENTS

| | | | |
|---|---|---|---|
| 7,760,666 B2 * | 7/2010 | Jang et al. | 370/255 |
| 2002/0181485 A1 * | 12/2002 | Cao et al. | 370/419 |
| 2003/0095504 A1 | 5/2003 | Ogier | |
| 2004/0042434 A1 | 3/2004 | Kennedy | |
| 2004/0106408 A1 | 6/2004 | Beasley et al. | |
| 2004/0240669 A1 | 12/2004 | Kempf et al. | |
| 2005/0265360 A1 * | 12/2005 | Kim et al. | 370/400 |
| 2007/0072604 A1 * | 3/2007 | Wang | 455/428 |
| 2007/0274232 A1 * | 11/2007 | Axelsson et al. | 370/254 |

OTHER PUBLICATIONS

T. Narten et al.; Network Working Group, RFC:2461, (Dec. 1998); "Neighbor Discovery for IP Version 6 (IPV6)".*
Network Working Group ; T. Narten; Request for Comments: 2461 IBM; Category: Standards Track Sun Microsystems; W. Simpson; Daydreamer; Dec. 1998.*

* cited by examiner

*Primary Examiner* — Kamran Afshar
*Assistant Examiner* — Khalid Shaheed
(74) *Attorney, Agent, or Firm* — NSIP Law (57) ABSTRACT

A mobile station and method for neighbor discovery are provided. The mobile station comprises a mapping table storing a connection identifier (CID) prefix and a neighbor identifier, a controller generating a CID with respect to a message that will be transmitted by referring to the mapping table, and a message transmitter transmitting, by using the CID, the message to a base station connected to the mobile station.

25 Claims, 10 Drawing Sheets

METHOD AND APPARATUS FOR NEIGHBOR DISCOVERY IN IPV6-BASED MOBILE SYSTEM

CROSS-REFERENCE TO RELATED APPLICATIONS

This application claims the benefit under 35 U.S.C. §119(e) of U.S. Patent Application No. 60/732,668 filed on Nov. 03, 2005, in the U.S. Patent Office and claims the benefit under 35 U.S.C. §119(a) of Korean Patent Application No. 10-2006-0045680, filed on May 22, 2006, in the Korean Intellectual Property Office, the entire disclosures of which are hereby incorporated by reference.

BACKGROUND OF THE INVENTION

1. Field of the Invention

The present invention relates to an Internet Protocol Version 6 (IPv6)-based mobile system. More particularly, the present invention relates to an apparatus and method for neighbor discovery in an IPv6-based mobile system using an Institute of Electrical and Electronics Engineers (IEEE) 802.16 link.

2. Description of the Related Art

IPv6 is a next generation Internet protocol that has been developed by the Internet Engineering Task Force (IETF) to solve problems of IPv4 currently used on the Internet. Neighbor discovery is a very important process in the operation of the IPv6. Nodes use the neighbor discovery to determine the link-layer addresses for neighbors known to reside on attached links. A node includes a host and a router.

Conversely, since broadband wireless access provides broadband communication without a wire, a larger amount of research with respect to the broadband wireless access has been conducted. According to the research, the Institute of Electrical and Electronics Engineers (IEEE) created IEEE 802.16 as a broadband wireless access specification, thereby causing a focus of research on broadband communication using EEE 802.16. IEEE 802.16 is a standard for a wireless air interface for wireless metropolitan area network (MAN)

Figure 1:
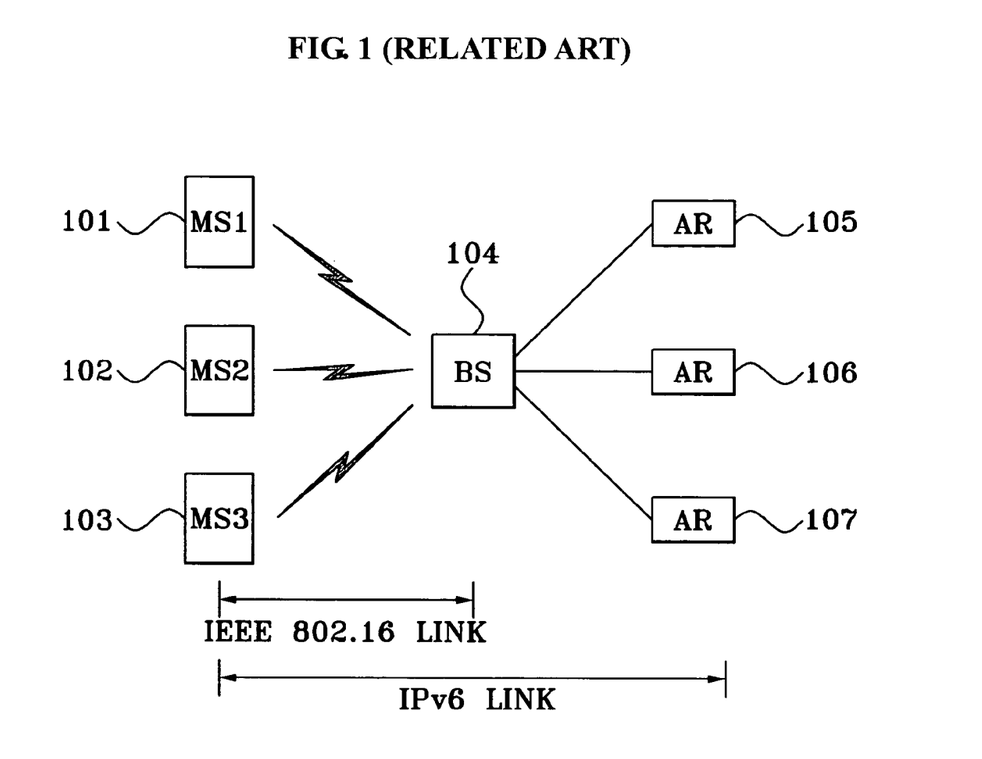
FIG. 1 is a diagram illustrating a network in which mobile stations are connected to a base station by an IEEE 802.16 link form an IPv6 link with access routers.

FIG. 1 is a diagram illustrating a network in which mobile stations 101, 102, and 103 are connected to a base station 104 by an IEEE 802.16 link form an IPv6 link with access routers 105, 106, and 107. In FIG. 1, the mobile stations 101, 102, and 103 are connected to the base station 104 by the IEEE 802.16 link. The mobile stations 101, 102, and 103 are connected to the access routers 105, 106, and 107 by the IPv6 link. Namely, the mobile stations 101, 102, and 103 and the access routers 105, 106, and 107 for an IPv6 network in which the mobile stations 101, 102, and 103 and the base station 104 use the IEEE 802.16 link.

As described above, in IPv6, neighbor discovery must be performed. For transmission of a message to a destination from the mobile stations 101, 102, and 103, the base station 104 must know a link layer address of a next hop to which the message received from the mobile stations 101, 102, and 103 will be transmitted. This process of looking for the link layer address of the next hop to which the message will be transmitted is known as neighbor discovery.

However, there have been no standards with respect to neighbor discovery operation on the IEEE 802.16 network until recently. From a viewpoint of IPv6 neighbor discovery, the base station 104 is just a link-level bridge. However, unlike IEEE 802.11, in IEEE 802.16, the base station 104 uses a connection identifier (CID) instead of a Media Access Control (MAC) address, thereby always operating as a termination point with respect to communication. Even though a message is received from the mobile stations 101, 102, and 103, the base station 104 has no way of determining where the message should be transmitted.

Figure 2:
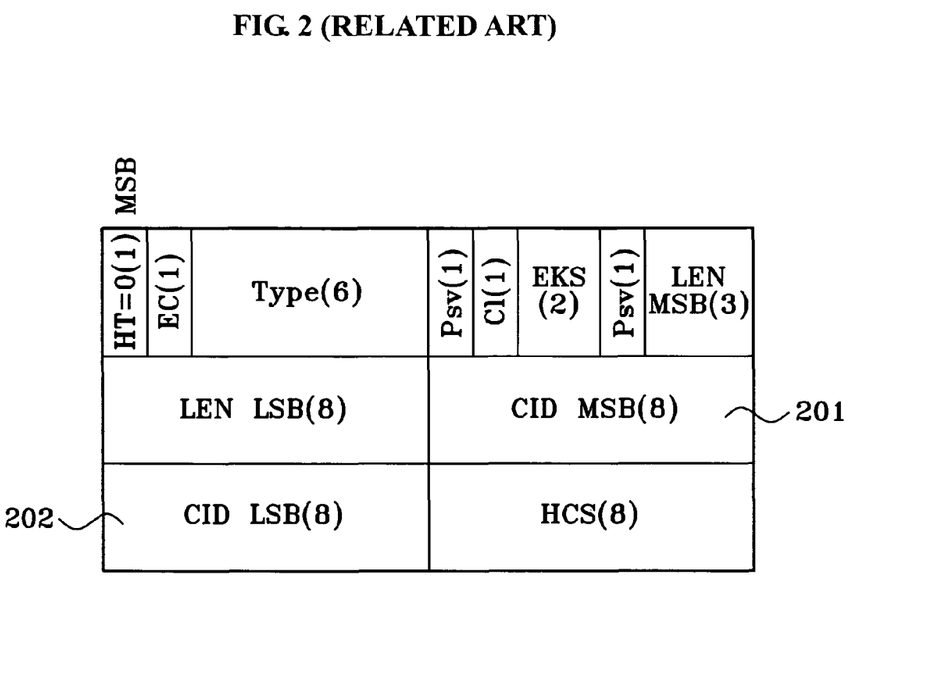
FIG. 2 is a diagram illustrating an IEEE 802.16 MAC header.

FIG. 2 is a diagram illustrating an IEEE 802.16 MAC header used in the IEEE 802.16 link between the mobile stations 101, 102, and 103 and the base station 104. As shown in FIG. 2, a field capable of storing a link layer address of a next hop is not defined in the IEEE 802.16 MAC header. In the IEEE 802.16 link, the mobile station 103, for example, uses CIDs 201 and 202 for communication with the base station 104.

As described above, IEEE 802.16 does not provide any solution with respect to the neighbor discovery operation. Therefore, a method in which a mobile station transmits an IEEE 802.16 header including an Ethernet header to a base station has been provided. However, according to the method, a frame including fields for the Ethernet header, which are not used, must be transmitted.

Accordingly, there is a need for a neighbor discovery function that facilitates the operation of IPv6 with respect to a link technology that does not provide the neighbor discovery operation, such as IEEE 802.16.

SUMMARY OF THE INVENTION

An aspect of exemplary embodiments of the present invention is to address at least the above problems and/or disadvantages and to provide at lest the advantages described below. Accordingly, an aspect of exemplary embodiments of the present invention is to provide a method and apparatus capable of supporting efficient neighbor discovery on an IEEE 802.16 network.

An aspect of an exemplary embodiment of the present invention also provides an efficient neighbor discovery method and apparatus that facilitates the operation of IPv6 with respect to a network technology that does not provide a neighbor discovery function.

According to an aspect of an exemplary embodiment of the present invention, a mobile station comprising a mapping table, a controller and a message transmitter is provided. The mapping table stores a connection identifier (CID) prefix and a neighbor identifier. The controller generates by:referring to the mapping table, a CID with respect to a message that will be transmitted. The message transmitter transmits, by using the CID, the message to a base station connected to the mobile station. The controller may identify a next hop CID prefix corresponding to a neighbor identifier of a next hop to which the message will be transmitted by referring to the mapping table, and may generate the CID based on the next hop CID prefix.

According to another aspect of an exemplary embodiment of the present invention, a base station comprising a mapping table, a controller and a message transmitter is provided. The base station stores a CID prefix and neighbor identifier. The controller identifies a next hop to which a message will be transmitted, from a CID of the message received from a mobile station by referring to the mapping table. The message transmitter transmits the message to the next hop. The controller may identify a next CID prefix from N upper bits of the CID and may identify a neighbor identifier of a next hop to which the message will be transmitted, from the next hop CID prefix by referring to the mapping table.

According to still another aspect of an exemplary embodiment of the present invention, a mobile station comprising a controller and a message transmitter is provided. The controller identifies a link layer address of a next hop to which a message will be transmitted by using a predetermined neighbor discovery method. The message transmitter transmits a frame comprising the message and the link layer address of the next hop to a base station, wherein the next hop is on the same link as the base station connected to the mobile station and the frame does not include an Ethernet header. The link layer address of the next hop may be included in a predetermined field of an IEEE 802.16 frame.

According to yet another aspect of an exemplary embodiment of the present invention, a base station comprising a message receiver and a message transmitter is provided. The message receiver receives a frame from a mobile station, the frame comprising a message and a link layer address of a next hop, which is on the same link as the base station. The message transmitter transmits the message to the next hop by using the link layer address of the next hop wherein the frame does not include an Ethernet header. The link layer address of the next hop may be included in a predetermined field of an IEEE 802.16 frame.

According to a further aspect of an exemplary embodiment of the present invention, abase station comprising-a message receiver, a destination cache, a controller and a message transmitter is provided. The message receiver receives a message in the form of IEEE 802.16 from a mobile station. The destination cache stores a destination IP address and an IP address of a next hop corresponding to the destination IP address. The controller determines the IP address of the next hop corresponding to the destination IP address by referring to the destination cache when the destination IP address of the message is stored in the destination cache. The message transmitter transmits the message received from the mobile station to the next hop by using the IP address of the next hop.

According to another aspect of an exemplary embodiment of the present invention, a base station comprising a storage unit, a message receiver, a controller and a message transmitter is provided. The storage unit stores a default router list, an on-link prefix list, a destination cache and a neighbor cache that are defined in Request For Comment (RFC) 2461. The message receiver receives a message from a mobile station. The controller determines a link layer address of a next hop to which the received message will be transmitted, by using a neighbor discovery method of RFC 2461, referring to the default router list, the on-link prefix list, the destination cache, and the neighbor cache. The message transmitter transmits the message to the next hop, referring to the link layer address of the next hop.

According to another aspect of an exemplary embodiment of the present invention, a neighbor discovery method is provided. A mapping table is maintained which stores a CID prefix and a neighbor identifier. A CID is generated with respect to a message that will be transmitted by referring to the mapping table. The message is transmitted to a base station connected to the mobile station by using the CID.

According to another aspect of an exemplary embodiment of the present invention, a neighbor discovery method is provided. A mapping table that stores a CID prefix and a neighbor identifier is maintained. A next hop to which a message received from a mobile station will be transmitted is identified, from a CID of the message by referring to the mapping table. The message is transmitted to the next hop.

According to another aspect of an exemplary embodiment of the present invention, a neighbor discovery method is provided. A link layer address of a next hop to which a message will be transmitted is identified by using a predetermined neighbor discovery method. A frame including the message and the link layer address of the next hop is transmitted to a base station connected to a mobile station, wherein the next hop is on the same link as the base station and the frame does not include an Ethernet header.

According to another aspect of an exemplary embodiment of the present invention, a neighbor discovery method is provided in which a frame is received. The frame includes a link layer address of a next hop and a message from a mobile station. The message is transmitted to the next hop by using the link layer address of the next hop, wherein the next hop is on the same link as a base station and the frame does not include an Ethernet header.

According to another aspect of an exemplary embodiment of the present invention, a neighbor discovery method is provided in which a message in the form of IEEE 802.16 is received from a mobile station. A destination cache is maintained and a destination IP address and an IP address of a next hop is stored corresponding to the destination IP address. The IP address of the next hop corresponding to a destination IP address of the message is determined when the destination IP address is stored in the destination cache. The message received from the mobile station is transmitted to the next hop by using the IP address of the next hop.

According to another aspect of an exemplary embodiment of the present invention, a neighbor discovery method is provided in which a default router list, an on-link prefix list, a destination cache, and a neighbor cache that are defined in RFC 2461 are maintained. A message from a mobile station is received. A link layer address of a next hop to which the received message will be transmitted by referring to the default router list, the on-link prefix list, the destination cache, and the neighbor cache, is determined by using a neighbor discovery method of RFC 2461. The message is transmitted to the next hop by referring to the link layer address of the next hop.

BRIEF DESCRIPTION OF THE DRAWINGS

The above and other exemplary objects, features and advantages of certain exemplary embodiments of the present invention will be more apparent from the following description taken in conjunction with the accompanying drawings, in which.

DETAILED DESCRIPTION OF THE INVENTION

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness. 7

Figure 3:
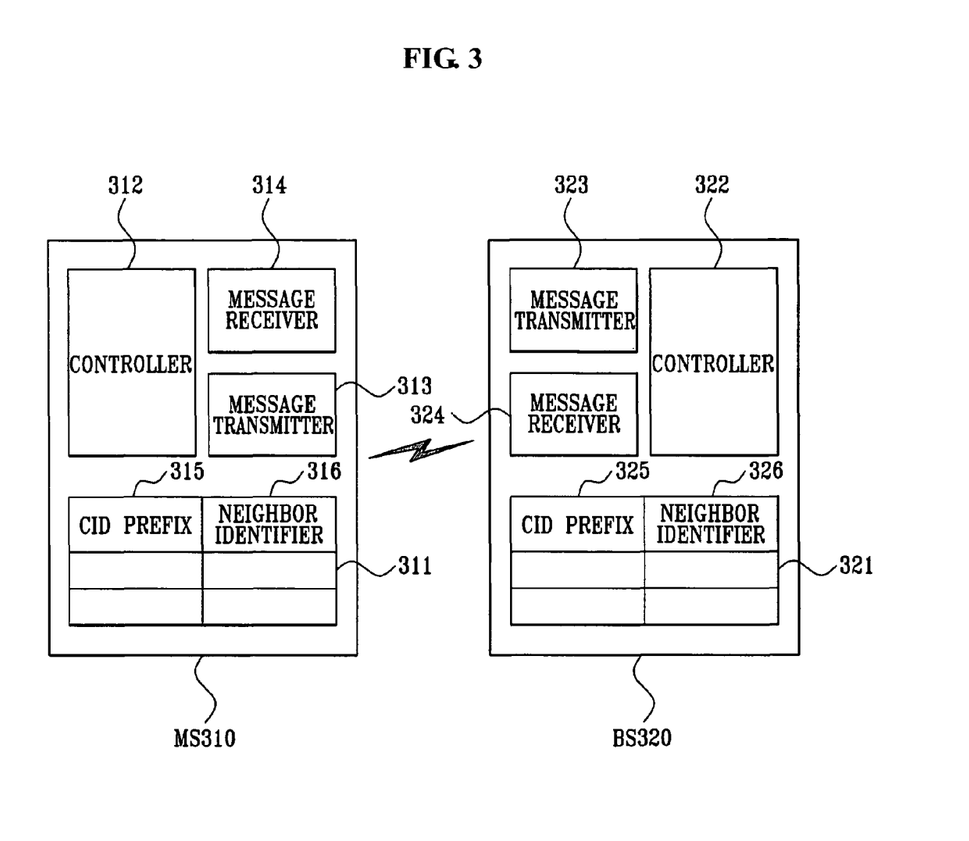
FIG. 3 is a block diagram illustrating a mobile station and a base station according to a first exemplary embodiment of the present invention.

FIG. 3 is a block diagram illustrating a mobile station 310 and a base station 320 according to a first exemplary embodiment of the present invention.

The mobile station 310 is connected to the base station 320 by an IEEE 802.16 link. According to the exemplary embodiment of the present invention, the mobile station 310 and the base station 320 include mapping tables 311 and 321, respectively. The mapping tables 311 and 321 include CID prefixes and neighbor identifiers, respectively. The mobile station 310 transmits an IEEE 802.16 frame including a mutually agreed upon CID prefix with respect to a next hop that is a neighbor to which a message will be transmitted, to the base station 320. The base station 320 may recognize the next hop to which the received message will be transmitted.

The mobile station 310 includes the mapping table 311, a controller 312, a message transmitter 313, and a message receiver 314.

The mapping table 311 stores a CID prefix 315 and a neighbor identifier 316. The CID prefix 315 is N upper bits of a CID. In the exemplary embodiment of the present invention, bits forming the CID, namely, the CID prefix 315, are used for identifying the next hop. According to an exemplary embodiment of the present invention, different CID prefixes are assigned to each router on the same link as the base station 320. Also, the same CID prefix is assigned to all the nodes excluding any router on the same link as the base station 320. The neighbor identifier 316 is an identifier with respect to the node on the same link as the base station 320 connected to the mobile station 310. As the neighbor identifier 316, a link layer address of the node or an IP address of the node may be used.

For example, a case in which a CID prefix is four bits will be described. A CID prefix "0001" is an indicator with respect to the access router 105 connected to the base station 104, and a CID prefix "0010" is an indicator with respect to the access router 106, and a CID prefix "0011" is an indicator with respect to the access router 107. The mapping table 311 stores the CID prefix "0001" and a neighbor identifier with respect to the access router 105. The neighbor identifier may be a link layer address or an IP address of the access router 105. Similarly, the CID prefix "0010" and a neighbor identifier of the access router 106 are stored in the mapping table 311. The CID prefix "0011" and a neighbor identifier of the access router 107 are stored in the mapping table 311.

The controller 312 of the mobile station 310 generates a CID by referring to the mapping table 311, with respect to a message that will be transmitted. The controller 312 identifies a next hop CID prefix corresponding to a neighbor identifier of a next hop that will receive the message. For example, when the next hop that will receive the message is the access router 105, the CID prefix "0001" with respect to the access router 105 is identified by referring to the mapping table 311.

The controller 312 generates a CID based on the next hop CID prefix. In detail, the controller 312 assigns a CID postfix with respect to the next hop. For example, since a CID is 16 bits according to IEEE 802.16, when N bits are used as a CID prefix, 16-N bits are used as a CID postfix. In the above example, since four bits are used as the CID prefix, the CID postfix is 12 bits. Since only one CID can be between a mobile station and a base station, a CID postfix is assigned to satisfy this condition. For example, when "000011110000" is assigned to the CID postfix, the controller 312 generates a CID by concatenating the next hop CID prefix and the CID postfix. When the CID prefix is "0001" and the CID prefix is "000011110000," the generated CID becomes "0001000011110000".

The message transmitter 313 transmits the message to the base station 320 connected to the mobile station 310 by using the generated CID because communication between the mobile station 310 and the base station 320 is performed by using the CID. The message receiver 314 receives the message from the base station.

The base station 320 includes the mapping table 321, a controller 322, and a message transmitter 323, and a message receiver 324.

The mapping table 321 stores a CID prefix 325 and a neighbor identifier 326. Since the CID prefix 325 and the neighbor identifier 326 are identical with the CID prefix 315 and the neighbor identifier 316 of the mapping table 311 of the mobile station 320, a detailed description will be omitted. The message receiver 324 receives an IEEE 802.16 frame including a CID and a message.

The message receiver 324 receives a message from the mobile station 310, and the message transmitter 323 transmits the message to a next hop.

The controller 322 identifies the next hop to which the message will be transmitted, from a CID of the message received from the mobile station 310 by referring to the mapping table 321. The controller 322 identifies a next hop CID prefix in detail from N upper bits of the CID and identifies a neighbor identifier of the next hop to which the message will be transmitted, from the next hop CID prefix by referring to the mapping table 321. For example, when four upper bits are used as the next hop CID prefix, the controller 322 may identify the next hop from the four upper bits of the CID. When the CID prefix is "0001," the controller 322 may recognize that the received message has to be transmitted to the access router 105. A link layer address of a node on the same link as the base station 320 may be used as the neighbor identifier 325 of the mapping table 321. In the above example, when the CID prefix is "0001," the message received by the base station 320 has to be transmitted to the access router 105. In this case, the message is transmitted to the access router 105 that is the next hop, by using a link layer address of the access router 105 corresponding to the CID prefix "0001" in the mapping table 321. When the neighbor identifier 325 of the mapping table 321 is not the link layer address of the node, the controller 322 identifies the link layer address of the next hop by using Address Resolution Protocol (ARP).

Figure 4:
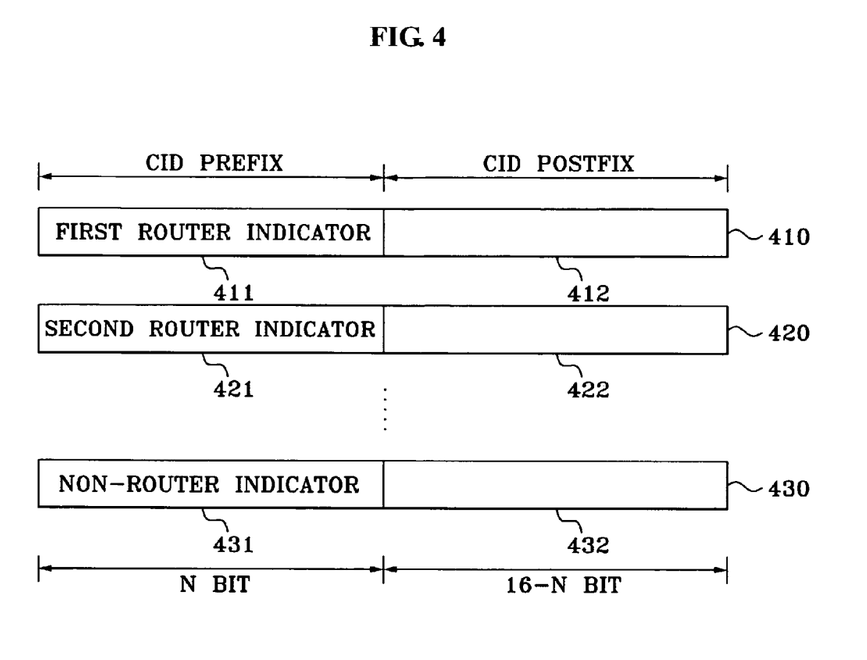
FIG. 4 is a diagram illustrating a CID according to the first exemplary embodiment of the present invention.

FIG. 4 is a diagram illustrating a CID field of an IEEE 802.16 frame when a mobile station is connected to a base station by an IEEE 802.16, according to the first exemplary embodiment of the present invention. In an exemplary embodiment of the present invention, a CID is divided into a CID prefix and a CID postfix. The CID prefix is N upper bits of the CID and is used for identifying a next hop. According to an exemplary embodiment of the present invention, different CID prefixes are assigned to each router on the same link as the base station. A CID prefix 411 of a CID 410 is an indicator of a first router, and another CID prefix 421 of another CID 420 is an indicator of a second router. According to an exemplary implementation, different values are assigned since the CID prefix 411 and the other CID prefix 421 identify different routers. Also, the same CID is assigned to nodes excluding the routers on the same link as the base station. For example, a CID prefix 431 of a CID 430 is a non-router indicator and "1100" is assigned to the CID prefix 431. In this case, when there are four nodes excluding the routers on the same link as the base station, the CID prefix "1100" is assigned to all the nodes. The CID postfixes 412, 422, and 432 are values assigned by the mobile station to make the CID a unique value.

When a next hop CID prefix of the message received by the message receiver 324 is the CID prefix with respect to the nodes excluding the routers, for example, the non-router indicator, the controller 322 identifies a link layer address of a next hop to which the message will be transmitted, by using ARP. When the next hop is not a router, the next hop becomes one of the terminal nodes connected to the base station 320. In this case, the next hop is a destination that will receive the message.

Figure 5:
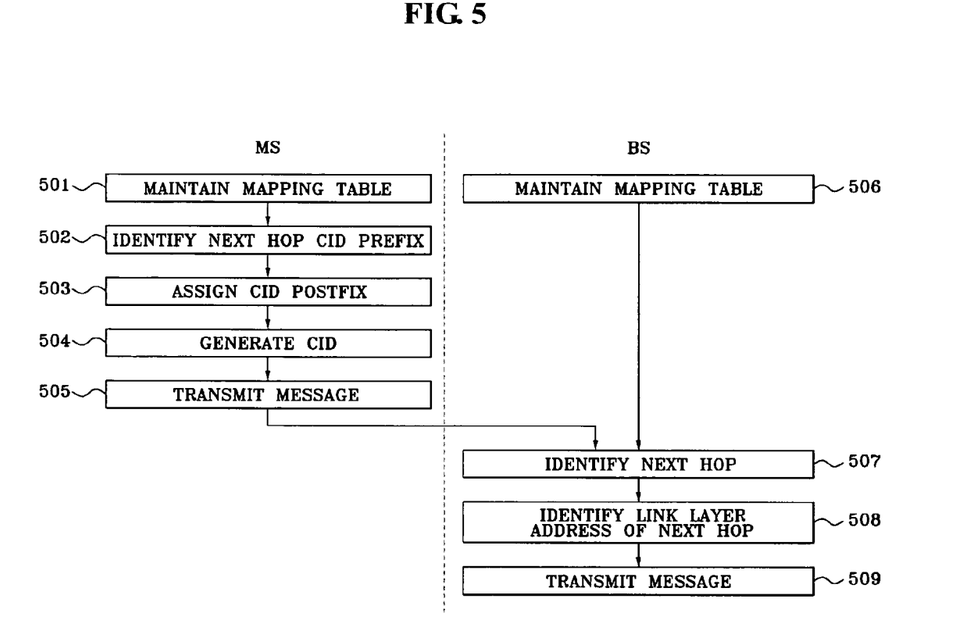
FIG. 5 is a flowchart illustrating a neighbor discovery method according to the first exemplary embodiment of the present invention.

FIG. 5 is a flowchart illustrating a neighbor discovery method according to the first exemplary embodiment of the present invention.

In step 501, the mobile station 310 maintains the mapping table 311 by storing a CID prefix and a neighbor identifier.

In step 502 through step 504, the mobile station 310 generates a CID with respect to a message that will be transmitted, by referring to the mapping table 311. In detail, in step 502, the controller 312 of the mobile station 310 identifies a next hop CID prefix corresponding to a neighbor identifier of a next hop to which the message will be transmitted, by referring to the mapping table 311. In step 503, the controller 312 assigns a CID postfix with respect to the next hop. In step 504, the controller 312 generates the CID by concatenating the next hop CID prefix and the CID postfix.

In step 505, the mobile station 310 transmits the message to the base station 320 connected to the mobile station 310, by using the CID. In this case, the message will be transmitted by an IEEE 802.16 link.

In step 506, the base station 320 maintains the mapping table 321 storing a CID prefix and a neighbor identifier.

In step 507, the base station 320 identifies a next hop to which a message will be transmitted, from a CID of the message received from the mobile station 310, by referring to the mapping table 321. In detail, the base station 320 identifies a next hop CID prefix from N upper bits of the CID and identifies a neighbor identifier of the next hop to which the message will be transmitted, from the next hop CID prefix by referring to the mapping table 321. In step 508, when the next hop CID prefix is a CID prefix with respect to nodes excluding routers, the base station 320 identifies a link layer address of the next hop to which the message will be transmitted, by using ARP.

In step 509, the base station 320 transmits the message to the next hop by using the identified link layer address of the next hop. When the next hop CID prefix is a CID prefix with respect to a router and the neighbor identifier corresponding to the CID prefix of the mapping table 321 is a link layer address of the router, the base station 320 transmits the message to the next hop by using the link layer address of the router.

Figure 6:
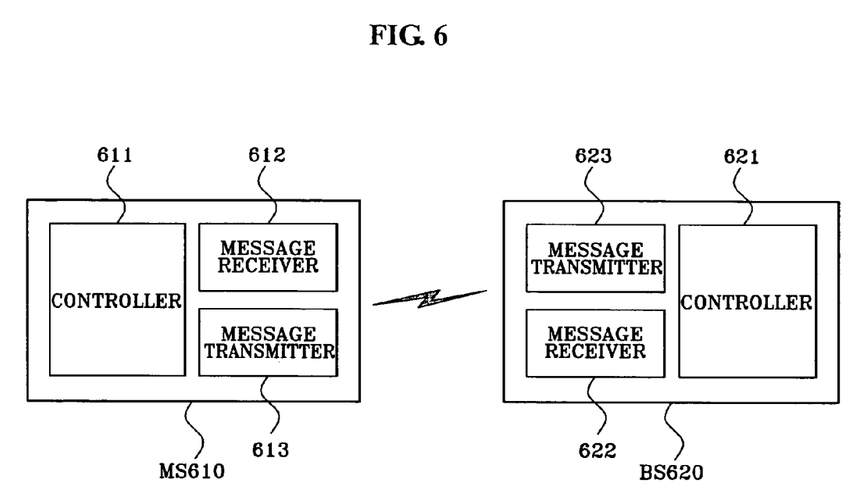
FIG. 6 is a block diagram illustrating a mobile station and a base station according to a second exemplary embodiment of the present invention.

FIG. 6 is a block diagram illustrating a mobile station and a base station according to a second exemplary embodiment of the present invention.

In the second exemplary embodiment of the present invention, the mobile station identifies a link layer address of a next hop and transmits an IEEE 802.16 frame, including the link layer address, to the base station. The base station transmits a message to the next hop by using the received link layer address of the next hop.

A mobile station 610 includes a controller 611, a message receiver 612, and a message transmitter 613. The message receiver 612 receives a message from a base station 620, and the message transmitter transmits a message to the base station 620.

The controller 611 identifies a link layer address of a next hop to which a message will be transmitted, by using a predetermined neighbor discovery method. The next hop is a node on the same link as the base station 620 that is connected to the mobile station 610. Using the neighbor discovery method, the mobile station 610 may request information of all nodes on the same link as the base station 620. This may include a link layer address, of the base station 620 connected to the mobile station 610. Based on the received information, the mobile station 610 identifies the link layer address of the next hop to which the message will be transmitted.

Figure 7:
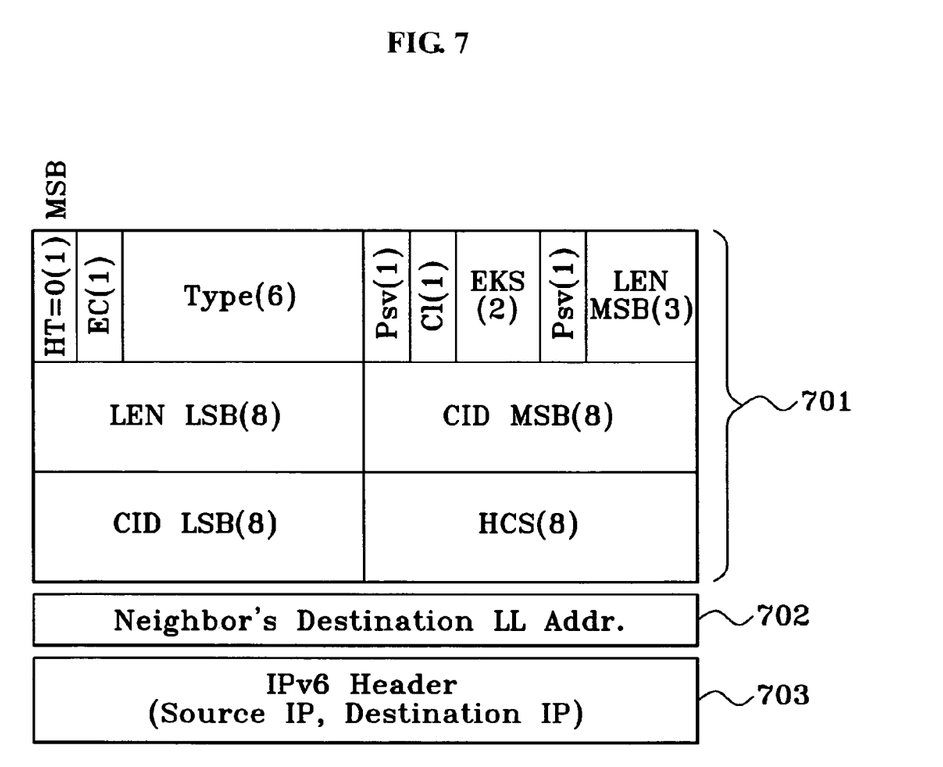
FIG. 7 is a diagram illustrating an example of a frame transmitted from the mobile station to the base station according to the second exemplary embodiment of the present invention.

The message transmitter 613 transmits a frame including the message and the link layer address of the next hop, to the base station 620. An example of the frame is illustrated in FIG. 7. Referring to FIG. 7, the message transmitter 613 transmits the message, including the link layer address of the next hop in a predetermined field of IEEE 802.16 frame. As shown in FIG. 7, according to the exemplary embodiment of the present invention, a field 702 storing the link layer address of the next hop is included in addition to an IEEE 802.16 header 701. In this case, when the message, including an IPv6 header 703, is transmitted, IPv6 may be supported and neighbor discovery may be supported. Particularly, as shown in FIG. 7, in the exemplary embodiment of the present invention, the frame transmitted from the mobile station 610 to the base station 620 does not include an Ethernet header. In an exemplary embodiment of the present invention, the neighbor discovery may be supported while minimizing data size of data added to the frame transmitted from the mobile station 610 since an entire Ethernet header is not included and only a link layer address of a next hop is included in a frame.

The base station 620 includes a controller 621, a message receiver 622, and a message transmitter 623.

The message receiver 622 receives a frame including a link layer address of a next hop and a message from the mobile station 610. The next hop is on the same link as the base station 620. According to an exemplary embodiment of the present invention, the link layer address of the next hop is included in a predetermined field of an IEEE 802.16 frame.

The controller 621 identifies the link layer address of the next hop from the frame received from the mobile station 610. The message transmitter 623 transmits the message to the next hop by using the link layer address of the next hop.

Figure 8:
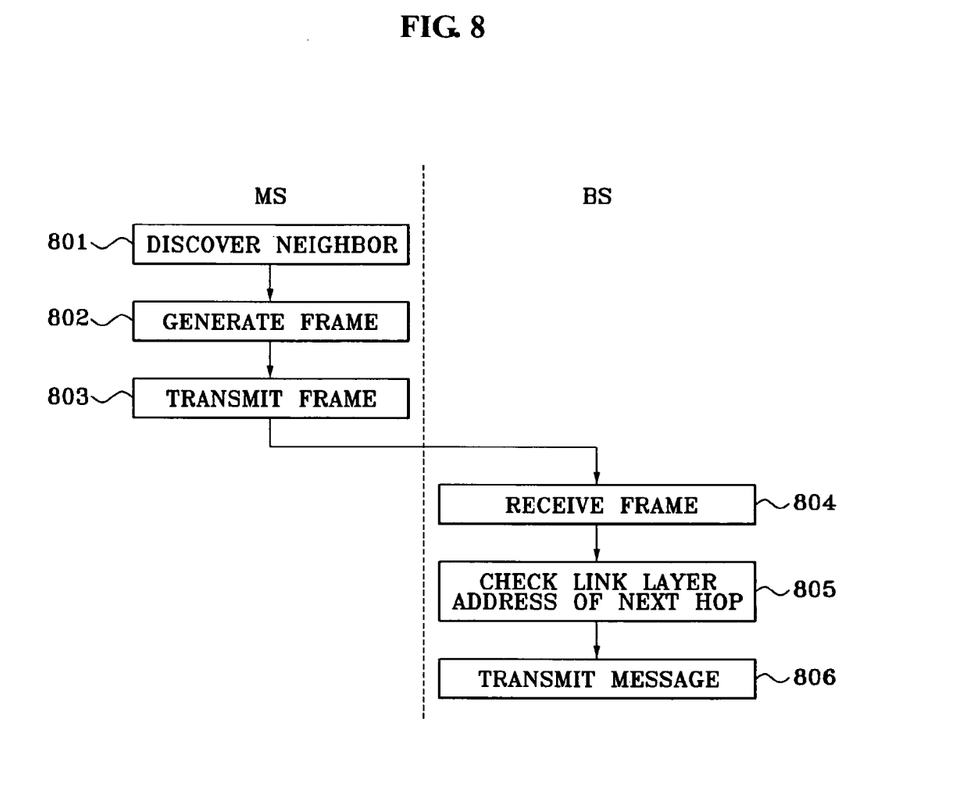
FIG. 8 is a flowchart illustrating a neighbor discovery method according to the second exemplary embodiment of the present invention.

FIG. 8 is a flowchart illustrating a neighbor discovery method according to the second exemplary embodiment of the present invention.

In step 801, the mobile station 610 identifies a link layer address of a next hop to which a message will be transmitted, by using a predetermined neighbor discovery method. The next hop is on the same link as the base station 620 connected to the mobile station 610.

In step 802, the mobile station 610 generates a frame including the message and the link layer address of the next hop. In this case, the link layer address of the next hop is included in a predetermined field of an IEEE 802.16 frame.

In step 803, the mobile station 610 transmits the frame including the message and the link layer address of the next hop, to the base station 620.

In step 804, the base station 620 receives the frame including the link layer address of the next hop and the message from the mobile station 610. The next hop is on the same link as the base station 620.

In step 805, the base station 620 verifies the link layer address of the next hop from the received frame.

In step 806, the base station 620 transmits the message to the next hop by using the link layer address of the next hop.

Figure 9:
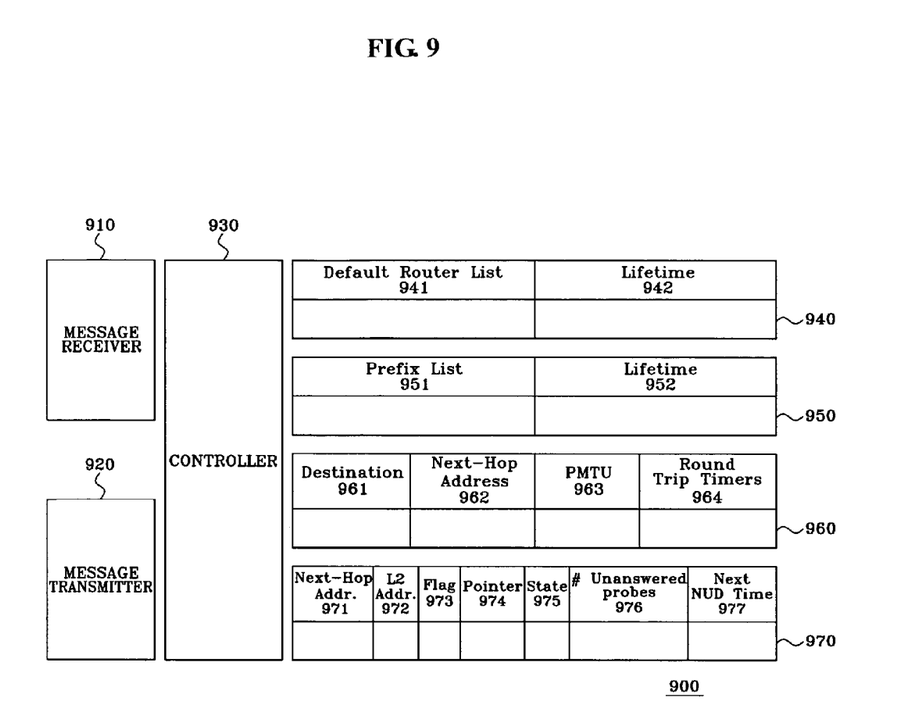
FIG. 9 is a block diagram illustrating a base station according to a third exemplary embodiment of the present invention.

FIG. 9 is a block diagram illustrating a base station 900 according to a third exemplary embodiment of the present invention.

In the exemplary embodiment of the present invention, neighbor discovery according to RFC 2461 is performed by the base station 900, instead of mobile stations connected to the base station 900. The base station 900 maintains a default router list 940, an on-link prefix list 950, a destination cache 960 and a neighbor cache 970 that are defined in RFC 2461. The base station 900 determines a link layer address of a next hop to which a received message will be transmitted, by using a neighbor discovery method. The base station 900 also determines a link layer address by referring to the default router list 940, the on-link prefix list 950, the destination cache 960 and the neighbor cache 970. After directly determining the link layer address of the next hop, the base station 900 transmits the message to the next hop by referring to the link layer address of the next hop. In this case, mobile stations do not support the neighbor discovery method of RFC 2461 and just have to communicate with the base station 900 by IEEE 802.16.

The base station 900, according to the exemplary embodiment of the present invention, includes a message receiver 910, a message transmitter 920, a controller 930 and a storage unit. The storage unit includes the default router list 940, the on-link prefix list 950, the destination cache 960, and the neighbor cache 970 that are defined in RFC 2461. According to RFC 2461, the default list 940, the on-link prefix list 950, the destination cache 960, and the neighbor cache 970 are stored in each of nodes. However, in an exemplary embodiment of the present invention, the default list 940, the on-link prefix list 950, the destination cache 960, and the neighbor cache 970 are stored only in the base station 900.

The message receiver 910 receives a message in the form of IEEE 802.16 from a mobile station. The message transmitter 920 transmits the message received from the mobile station to a next hop by using an IP address of the next hop.

The default router list 940 stores information with respect to default routers. In detail, the default router list 940 stores a list 941 of the default routers and a lifetime field 942 indicating a valid time period of the default router list information. The on-link prefix list 950 stores an IP address prefix of a node on the same link as the base station 900. In detail, the on-link prefix list 950 stores a prefix list field 951 of network addresses of nodes on the same link as the base station 900 and a lifetime field 952 are included.

The destination cache 960 stores a destination IP address 961 and an IP address of a next hop 962 corresponding to the destination IP address. In detail, a destination IP address 961 and an IP address of a next hop 962 storing an IP address of a next hop to which a message having a corresponding destination IP address will be transmitted are included. Also, a PMUT field 963 used in a transport protocol and a round trip timer field 964 maintained by the transport protocol.

The neighbor cache 970 stores an IP address of a node on the same link as the base station 900 and a link layer address of the node. In detail, the neighbor cache 970 includes a next hop address field 971 storing the IP address of the node on the same link and an L2 address field 972 storing the link layer address of the node (next hop). Also, the neighbor cache 970 includes a flag field 973 identifying whether a next hop is a host or a router, a pointer 974 to any queued packets waiting for address resolution to complete, a reachability state field 975, a number of unanswered probes 976, and a neighbor unreachability detection (NUD) time field 977.

Figure 10:
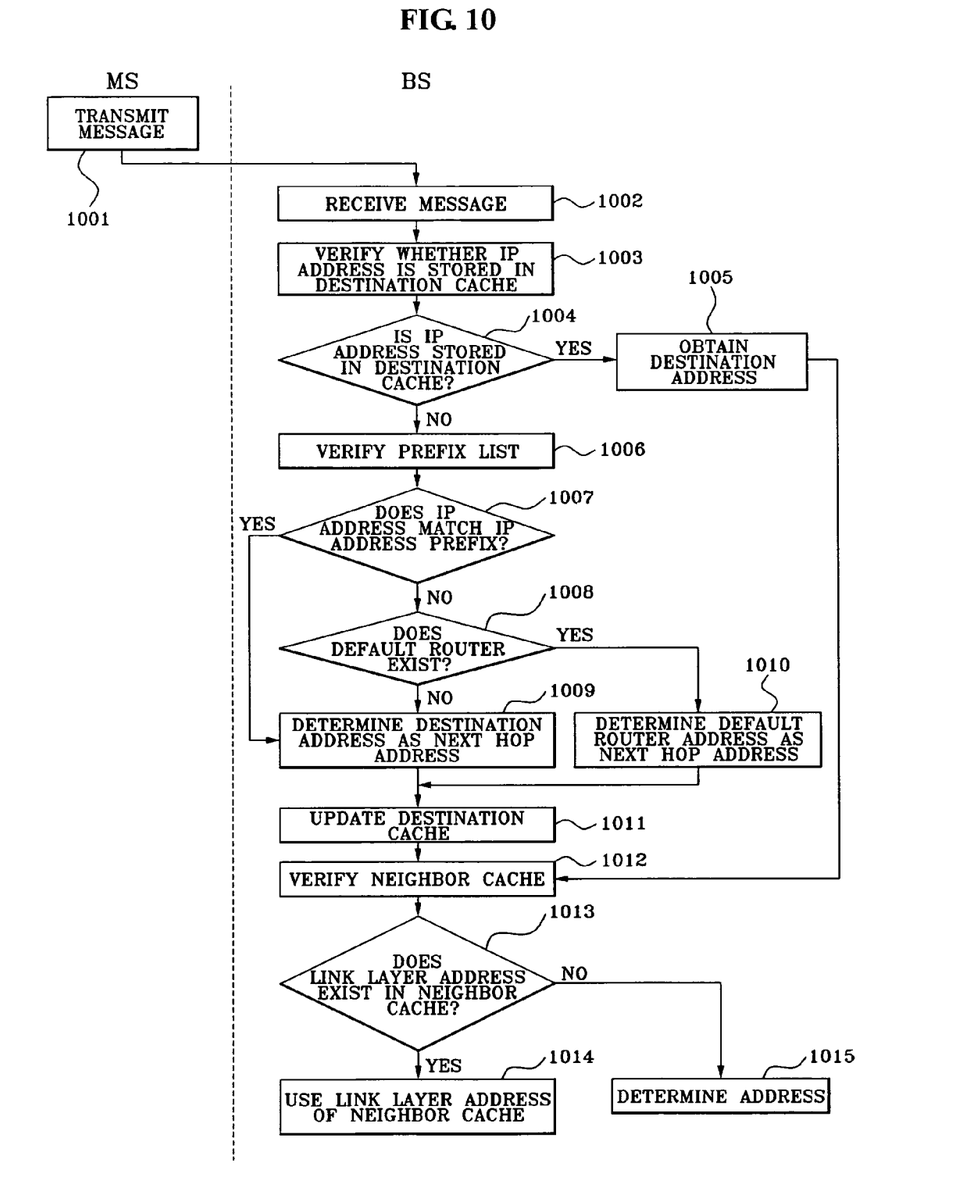
FIG. 10 is a flowchart illustrating a neighbor discovery method according to the third exemplary embodiment of the present invention.

FIG. 10 is a flowchart illustrating a neighbor discovery method according to the third exemplary embodiment of the present invention.

In step 1001, a mobile station transmits a message to the base station 900. When the mobile station communicates with the base station 900 by an IEEE 802.16 link, the message is in the form of IEEE 802.16. In step 1002, the message receiver 910 of the base station 900 receives the message in the form of IEEE 802.16 from the mobile station. The base station maintains the default list 940, the on-link prefix list 950, the destination cache 960, and the neighbor cache 970 that are defined in RFC 2461.

In step 1003, the controller 930 verifies whether a destination IP address of the message is stored in the destination cache 960. In step 1004, a determination is made as to whether the destination IP address of the message is stored in the destination cache 960. In step 1005, when it is determined in step 1004 that the destination IP address of the message is stored in the destination cache 960, the controller 930 determines an IP address of a next hop corresponding to the destination IP address by referring to the destination cache 960.

In step 1006, when it is determined in step 1004 that the destination IP address of the message is not stored in the destination cache 960, the controller 930 verifies whether the destination IP address of the message matches an IP address prefix stored in the on-link prefix list 950. In step 1007, whether the destination IP address of the message matches the IP address prefix stored in the on-link prefix list 950 is determined. In step 1009, when it is determined in step 1007 that the destination IP address matches the IP address prefix stored in the on-link prefix list 950, the destination IP address is determined to be the IP address of the next hop.

In step 1008, when it is determined in step 1007 that the destination IP address does not match the IP address prefix stored in the on-link prefix list 950, whether a default router exists in the default router list 940 is verified. When the default router exists, the controller 930 determines an IP address to be the IP address of the next hop in step 1010.

Using the IP address of the next hop, determined in step 1009 and step 1010, the controller 930 updates the destination IP address field 961 and the next hop IP address field 962 in the destination cache 960 in step 1011.

In step 1012, the controller 930 verifies whether a link layer address of the next hop corresponding to the IP address of the next hop, determined in step 1009 and step 1010, is stored in the neighbor cache 970.

In step 1013, whether the link layer address of the next hop corresponding to the IP address of the next hop is stored in the neighbor cache 970 is determined.

When it is determined in step 1013 that the link layer address of the next hop corresponding to the IP address of the next hop is stored in the neighbor cache 970, the controller 930 determines the link layer address of the next hop corresponding to the IP address of the next hop by referring to the neighbor cache 970 in step 1014.

When it is determined in step 1013 that the link layer address of the next hop corresponding to the IP address of the next hop is not stored in the neighbor cache 970, the controller 930 determines the link layer address of the next hop corresponding to the IP address of the next hop by using ARP in step 1015.

The message transmitter 920 transmits the message to the next hop by using the determined link layer address of the next hop.

According to an exemplary embodiment of the present invention, since address resolution is not performed in a mobile station, consumption of bandwidth may be reduced and power consumption of the mobile station may be reduced.

According to a method and apparatus of an exemplary embodiment of the present invention, efficient neighbor discovery on an IEEE 802.16 network is supported. Also, according to an aspect of an exemplary embodiment of the present invention, an efficient neighbor discovery method and an apparatus using the same is provided. This facilitates the operation of IPv6 with respect to a network technology that does not provide a neighbor discovery function.

Also, in an exemplary embodiment of the present invention, since a change occurs with respect to a mobile station and a base station, all routers according to an IPv6 specification may be connected and used.

The case of using the IEEE 802.16 link has been described above. However, exemplary embodiments of the present invention may be applied to the other network technologies that do not provide a neighbor discovery function.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile station comprising:
a mapping table for storing a plurality of connection identifier (CID) prefixes and a plurality of neighbor identifiers that correspond to the plurality of CID prefixes;
a controller for referring to the mapping table and identifying a next hop CID prefix with respect to a message to be transmitted from the mobile station, the next hop CID prefix corresponding to a neighbor identifier of a next hop to which the message is to be transmitted, and generating a CID with respect to the message by concatenating the next hop CID prefix and a predetermined CID postfix; and
a message transmitter for transmitting the message, using the generated CID, to a base station connected to the mobile station.

2. The mobile station of claim 1, wherein each respective CID prefix from among the plurality of CID prefixes comprises N upper bits from among a respective CID but less than all of the bits from the respective CID.

3. The mobile station of claim 1, wherein:
the CID prefix comprises N bits; and
the CID postfix comprises 16 N bits.

4. The mobile station of claim 1, wherein different CID prefixes are assigned to each router on the same link as the base station.

5. The mobile station of claim 1, wherein the same CID prefix is assigned to all the nodes excluding any router on the same link as the base station.

6. The mobile station of claim 1, wherein the neighbor identifier corresponds to an identifier with respect to the node on the same link as the base station connected to the mobile station.

7. The mobile station of claim 6, wherein the neighbor identifier comprises at least one of a link layer address and an IP address of the node.

8. The mobile station of claim 1, wherein a link between the mobile station and the base station comprises an IEEE 802.16 type link.

9. A base station comprising:
a mapping table for storing a plurality of connection identifier (CID) prefixes and a plurality of neighbor identifiers that correspond to the plurality of CID prefixes, wherein each of the neighbor identifiers identify a node on the same link as the base station;
a message receiver for receiving a message from a mobile station, the message comprising a CID that includes a next CID prefix concatenated with a predetermined CID postfix;
a controller for identifying the next CID prefix from N upper bits of the CID and identifying a neighbor identifier of a next hop to which a message is to be transmitted by referring to the mapping table using the next CID prefix; and
a message transmitter for transmitting the message to the next hop using the neighbor identifier of the next hop identified by the controller.

10. The base station of claim 9, wherein, in response to the next hop CID prefix comprising a CID prefix with respect to the node excluding a router, the controller identifies a link layer address of the next hop to which the message is to be transmitted, using Address Resolution Protocol (ARP).

11. The base station of claim 9, wherein, in response to the next hop CID prefix comprising a CID prefix with respect to a router,
the neighbor identifier corresponding to the CID prefix in the mapping table comprises a link layer address of the router; and
the controller transmits the message to the next hop using the link layer address of the router.

12. The base station of claim 9, wherein different CID prefixes are assigned to each router on the same link as the base station.

13. The base station of claim 9, wherein the same CID prefix is assigned to all the nodes excluding any router on the same link as the base station.

14. The base station of claim 9, wherein the neighbor identifier comprises an identifier with respect to the node on the same link as the base station.

15. The base station of claim 14, wherein the neighbor identifier comprises at least one of a link layer address and an IP address of the node.

16. The base station of claim 9, wherein a link between the mobile station and the base station comprises a IEEE 802.16 type link.

17. A neighbor discovery method comprising:
maintaining, at a mobile station, a mapping table storing a plurality of connection identifier (CID) prefixes and a plurality of neighbor identifiers that correspond to the plurality of CID prefixes, wherein each of the neighbor identifiers identify a node on the same link as a base station connected to the mobile station;
referring to the mapping table and identifying a next hop CID prefix with respect to a message to be transmitted from the mobile station, the next hop CID prefix corresponding to a neighbor identifier of a next hop to which the message is to be transmitted;
generating a CID with respect to the message by concatenating the next hop CID prefix with a predetermined CID postfix; and transmitting the message to a base station connected to the mobile station using the CID.

18. The method of claim 17, wherein
each respective CID prefix from among the plurality of CID prefixes comprises N upper bits from among a respective CID but less than all of the bits from the respective CID.

19. The method of claim 17, wherein different CID prefixes are assigned to each router on the same link as the base station.

20. The method of claim 17, wherein the same CID prefix is assigned to all the nodes excluding any router on the same link as the base station.

21. A neighbor discovery method comprising:
maintaining, at a base station, a mapping table storing a plurality of connection identifier (CID) prefixes and a plurality of neighbor identifiers that correspond to the plurality of CID prefixes, wherein each of the neighbor identifiers identify a node on the same link as the base station;
receiving a message from a mobile station, the message comprising a CID that includes a next CID prefix concatenated with a predetermined CID postfix;
identifying the next CID prefix from N upper bits of the CID;
identifying a neighbor identifier of a next hop to which the message is to be transmitted, by referring to the mapping table using the next CID prefix; and
transmitting the message to the next hop using the identified neighbor identifier.

22. The method of claim 21, wherein, in response to the next hop CID prefix comprising a CID prefix with respect to a node excluding a router, the identifying the neighbor identifier of the next hop comprises identifying a link layer address of the next hop to which the message is to be transmitted using ARP.

23. The method of claim 21, wherein, in response to the next hop CID prefix comprising a CID prefix with respect to a router and the neighbor identifier corresponding to the CID prefix in the mapping table comprises a link layer address of the router, the message is transmitted to the next hop by using the link layer address of the router.

24. The method of claim 21, wherein different CID prefixes are assigned to each router on the same link as the base station.

25. The method of claim 21, wherein the same CID prefix is assigned to all the nodes excluding any router on the same link as the base station.

* * * * *